(12) United States Patent
Venkatraman et al.

(10) Patent No.: US 6,571,388 B1
(45) Date of Patent: May 27, 2003

(54) BUILDING A CUSTOM SOFTWARE ENVIRONMENT INCLUDING PRE-LOADED CLASSES

(75) Inventors: Chandrasekar Venkatraman, Saratoga, CA (US); Venkatesh Krishnan, Sunnyvale, CA (US); Geetha Manjunath, Bangalore (IN); Kommarahalli S. Venugopal, Bangalore (IN); Devaraj Das, Bangalore (IN); Arunachalam Venkataramani, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/264,784

(22) Filed: Mar. 9, 1999

(51) Int. Cl.[7] .................................................. G06F 9/45
(52) U.S. Cl. ...................... 717/166; 717/108; 717/118; 717/147; 717/148; 717/153; 717/165; 717/167
(58) Field of Search ................................. 717/166, 106, 717/118, 140, 147, 148, 152, 153, 164, 165

(56) References Cited

U.S. PATENT DOCUMENTS 5,943,496 A * 8/1999 Li et al. ........................ 717/11
6,202,208 B1 * 3/2001 Holiday, Jr. .................. 717/11

OTHER PUBLICATIONS

Liang et al., "Dynamic Class Loading in the Java Virtual Machine", ACM, pp. 36–44, Oct. 1998.*
Li, Secure Java Class Loading, IEEE, pp. 56–61, Dec. 1998.*
Chen et al., "Design, and Implementation of a Java Execution Environment", IEEE, pp. 686–692, Dec. 1998.*
IBM Technical Disclosure Bulletin, "Java Dynamic Class Loader", vol. 39, No. 11, pp. 107–108, Nov. 1996.*

* cited by examiner

Primary Examiner—Gregory Morse
Assistant Examiner—Ted T. Vo

(57) ABSTRACT

A system for creating a custom environment for executing application programs in a target device. The system broadens the applicability of software environments like Java by providing custom pre-loaded classes for application programs and by customizing the procedures for class loading to the available resources in the target device. The system includes tools for generating a pre-load class list that specifies a set of classes needed to support the application program. The tools build the custom environment including a set of code for a virtual machine and a set of code for each of a set of pre-loaded classes specified in the pre-load class list. The virtual machine loads classes from the pre-loaded classes, a file system class library, and/or a networked class library using widely available network protocols.

15 Claims, 5 Drawing Sheets

BUILDING A CUSTOM SOFTWARE ENVIRONMENT INCLUDING PRE-LOADED CLASSES

BACKGROUND OF THE INVENTION

1. Field of Invention

The present invention pertains to the field of software systems. More particularly, this invention relates to building a custom software environment including pre-loaded classes.

2. Art Background

Computer systems and devices having embedded processing resources typically conform to one of a variety of differing architectures. Each architecture is usually defined by a particular instruction set, hardware register set, and memory arrangement, etc. An architecture may also be referred to as a hardware platform for software execution. Software such as application programs which are written or compiled to be executed on a particular hardware platform may be referred to as native code. An application program in the native code of a particular hardware platform usually does not run on other non compatible hardware platforms.

Some prior software environments enable application programs to execute on a variety of differing hardware platforms. Typically, such a software environment provides a set of predefined services that enable an application program to interact with the hardware and operating system of a particular hardware platform. The predefined services are usually specified in terms of application programming interfaces (APIs) which an application program uses to invoke the predefined services. Such a software environment is commonly implemented in an object-oriented programming language in which the predefined services are implemented as predefined classes.

One example of such a software environment is a Java virtual machine. Typically, a Java virtual machine for a particular hardware platform is an implementation of a set of predefined Java classes in native code. In addition, a Java virtual machine usually supports a set of predefined additional classes which may be referred to as class libraries. These class libraries are usually stored in a file system. These class libraries may also be stored on network based file systems which are accessible using network access features of the particular hardware platform. Typically, a Java virtual machine includes a class loader that loads classes from the class libraries as needed when executing a Java application program.

A software environment such as Java is usually specified in a "well-defined" software standard to which developers of virtual machines and application programs comply. Such a software standard usually specifies a set of APIs for the native classes which must be supported in an implementation of the software environment. Such a software standard also usually specifies a set of APIs for the class libraries which must be available in a local file system of the particular platform or network file system accessible by the particular platform.

Unfortunately, such well-defined software standards may limit the applicability of such a software environment. For example, such a software environment may have limited applicability to embedded systems which usually have limited resources in comparison to computer systems. Examples of embedded systems include telephones, audio and video equipment, home appliances, and computer peripherals.

For example, an embedded system may have little or no file system resources for storing the class libraries required by a well-defined standard. In addition an embedded system may have no network access or only sporadic or unreliable network access for loading class libraries required by a well-defined standard. Moreover, the costs of providing the file system and/or network access resources needed to support a well-defined standard may be prohibitively expensive for many embedded systems.

SUMMARY OF THE INVENTION

A system is disclosed for creating a custom environment for executing application programs in a target device. The system broadens the applicability of software environments like Java by providing custom pre-loaded classes for application programs and by customizing the procedures for class loading to the available resources in the target device. The system includes tools for generating a pre-load class list that specifies a set of classes needed to support the application program. The tools build the custom environment including a set of code for a virtual machine and a set of code for each of a set of pre-loaded classes specified in the pre-load class list. The virtual machine loads classes from the pre-loaded classes, a file system class library, and/or a networked class library using widely available network protocols.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
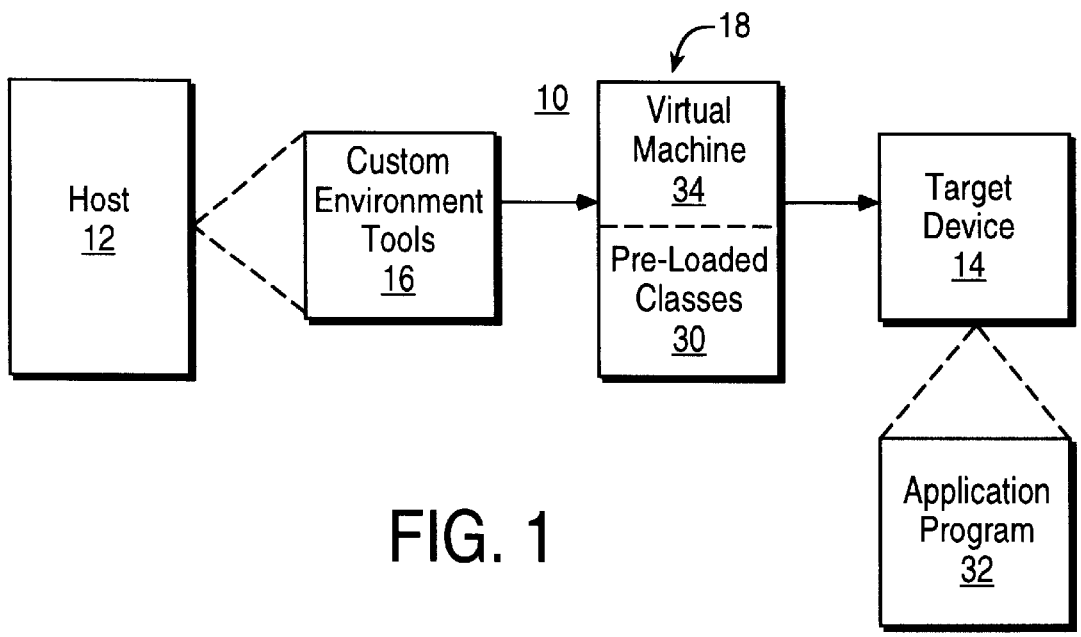
FIG. 1 illustrates a software development system including a set of tools for building a custom environment having pre-loaded classes.

FIG. 1 illustrates a software development system 10. The software development system 10 includes a set of custom environment tools 16. The custom environment tools 16 enable the development of a custom software environment 18 which is customized to support an application program 32 which executes on a target device 14. The custom software environment 18 is customized in response to the available resources in the target device 14 and the particular functions performed by the application program 32.

The custom environment tools 16 enable a software developer for the target device 14 to assemble together only those classes that are needed to support a desired application. This minimizes the amount of hardware resources needed in the target device 14 and broadens the applicability of programming languages like Java to embedded systems.

In addition, the custom environment tools 16 enable a software developer for the target device 14 to customize the class loading performed by the software environment 18 to the particulars of the target device 14 and the application program 32. The custom environment tools 16 provide, in one embodiment, the "write once run anywhere" capabilities of Java but with previously unavailable customization for target devices.

The application program 32 performs a set of predetermined functions in the target device 14 according to a particular application. The custom software environment 18 yielded by the custom environment tools 16 includes a virtual machine 34 which interprets instructions of the application program 32 and a set of pre-loaded classes 30 which are needed to support the application program 32.

The custom software environment 18 is customized to a particular application of the target device 14 in that the native classes of the virtual machine 34 and the pre-loaded classes 30 include only those classes that are needed for execution of the application program 32. This reduces the amount of class loading by the virtual machine 34 which would slow execution of the application program 32.

In addition, the custom software environment 18 is customized to a particular application of the target device 14 in that the class loader in the virtual machine 34 enables a developer to specify class libraries from differing sources depending upon the available resources and nature of the target device 14. For example, if the target device 14 has file system resources but no network access or sporadic network access then a developer may include all the necessary classes for the application program 32 in the pre-loaded classes 30 and/or in class libraries in the target device 14. On the other hand, if the target device 14 has little or no file system resources but has network resources sufficient for the widely supported hyper-text transfer protocol (HTTP) protocol then a developer may include all the necessary classes for the application program 32 in the pre-loaded classes 30 and/or in class libraries on an HTTP server.

The target device 14 represents any device which may benefit from the advantages provided by the custom environment tools 16. This may include devices with relatively little or no file system resources. The target device 14 may be an embedded system in which the application program 32 performs a set of relatively few functions in comparison to the functions performed in a computer system. Examples of embedded systems include telephones, audio and video equipment, home appliances, and computer peripherals.

The following description focuses on using the custom environment tools 16 to create the software environment 18 for the application program 32. However, these techniques are readily adaptable to customize the software environment 18 to multiple application programs in the target device 14.

Figure 2:
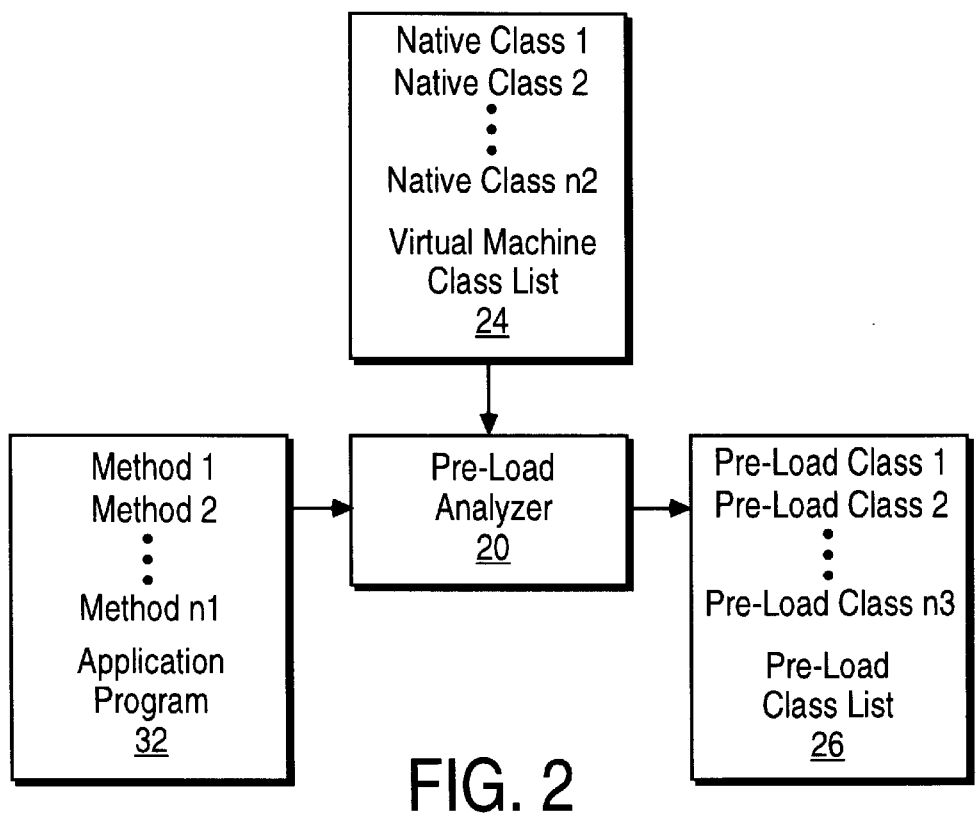
FIG. 2 illustrates the functions of a pre-load analyzer of the custom environment tools.

FIG. 2 illustrates the functions of a pre-load analyzer 20 which is part of the custom environment tools 16. The pre-load analyzer 20 is run on the host 12 when building the custom software environment 18 for execution of the application program 32 on the target device 14. The pre-load analyzer 20 analyzes the application program 32 to determine which classes are needed for it to execute on the target device 14. The pre-load analyzer 20 bases its analysis on a set of methods 1-n1 which are invoked by the application program 32.

The pre-load analyzer 20 takes as input a virtual machine class list 24. The virtual machine class list 24 specifies a set of native classes 1-n2 which are implemented in the virtual machine 34. In one embodiment, the native classes 1-n2 are Java classes associated with hardware interaction or interaction with an operating system of the target device 14.

The pre-load analyzer 20 takes as input a list of classes which are networked classes, if any, which are to be loaded from an HTTP server by the class loader of the virtual machine 34. These networked classes need not be included in the pre-load class list 26. If the pre-load analyzer 20 has previously analyzed one or more other applications for the target device 14 then it may take as input a list of classes provided in those applications. The classes already provided in those applications need not be included in the pre-load class list 26.

The pre-load analyzer 20 generates a pre-load class list 26. The pre-load class list 26 sets forth a set of pre-load classes 1-n3. The pre-load classes 1-n3 are classes needed to support the application program 32 and which are not included in the virtual machine class list 24. Any one or more of the pre-load classes 1-n3 may be subsequently built into the pre-loaded classes 30 of the custom software environment 18.

Figure 3:
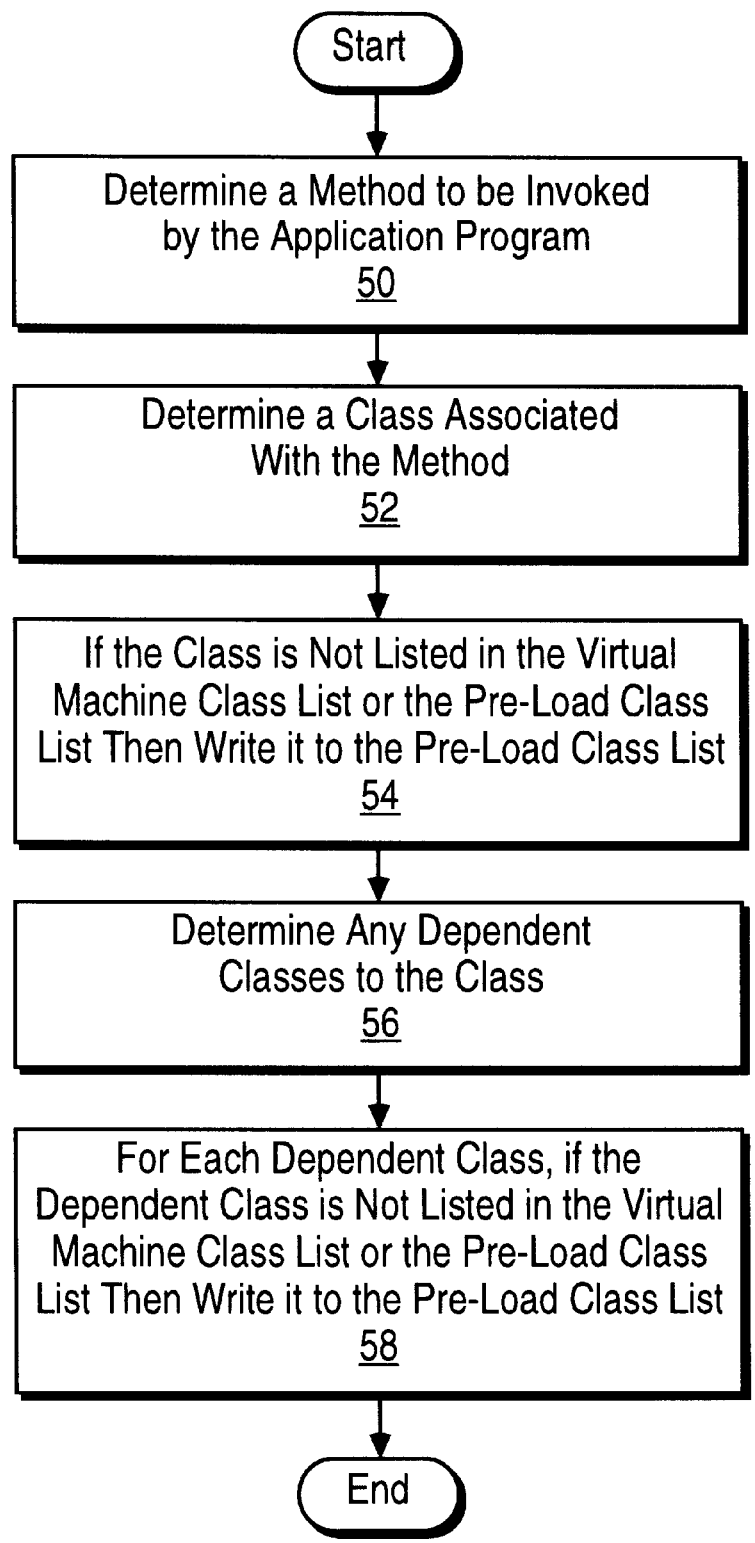
FIG. 3 illustrates steps implemented on the pre-load analyzer for generating the pre-load class list.

FIG. 3 illustrates steps implemented on the pre-load analyzer 20 for generating the pre-load class list 26. The pre-load analyzer 20 performs the steps 50-58 for each of the methods 1-n1 of the application program 32. At step 50, the pre-load analyzer 20 determines a method to be invoked by the application program 32 when it executes on the target device 14. The method determined at step 50 is one of the methods 1-n1 and may be determined for example by reading a source file associated with the application program 32.

At step 52, the pre-load analyzer 20 determines a class associated with the method determined at step 50. The class may be determined for example by reading class definition files associated with the application program 32.

At step 54, the pre-load analyzer 20 writes the class determined at step 52 to the pre-load class list 26 if the class determined at step 52 is not listed in the virtual machine class list 24 or in the pre-load class list 26. This is because it is not necessary to pre-load the class determined at step 52 if it is one of the native classes 1-n2 or if it is already listed as one of the pre-load classes 1-n3.

At step 56, the pre-load analyzer 20 recursively determines any dependant classes to the class determined at step 52. For example, the class determined at step 52 may be a subclass of another class which in turn may be a subclass of yet another class. These parent classes etc. are selected at step 56 as classes which depend from the class determined at step 52. In addition each dependant class may have its own set of dependent classes each of which may have its own set of dependant classes etc. The entire dependence tree is traversed at step 56 to determine the classes which depend from the class determined at step 52.

At step 58, for each dependent class determined at step 56, the pre-load analyzer 20 writes the dependant class to the pre-load class list 26 if the dependant class is not listed in the virtual machine class list 24 or in the pre-load class list 26. This is because it is not necessary to pre-load the dependant class if it is one of the native classes 1-n2 or if it is already listed as one of the pre-load classes 1-n3.

After steps 50–58 are completed for each method 1-n1 of the application program 32, the pre-load class list 26 contains the pre-load classes 1-n3 which may be included in the pre-loaded classes 30 of the custom software environment 18. The developer of the custom software environment 18, i.e. the user of the custom environment tools 16 can optionally specify some of the pre-load classes 1-n3 which are not to be included in the pre-loaded classes 30. For example, one or more of the pre-load classes 1-n3 that is seldom invoked or that consumes large amounts of resources in the target device 14 may be excluded from the pre-loaded classes 30 when the custom software environment 18 is built. The excluded ones of the pre-load classes 1-n3 may be loaded from a file system or via a network when needed during execution of the application program 32 in the target device 14 depending on the configuration of the target device 14.

Figure 4:
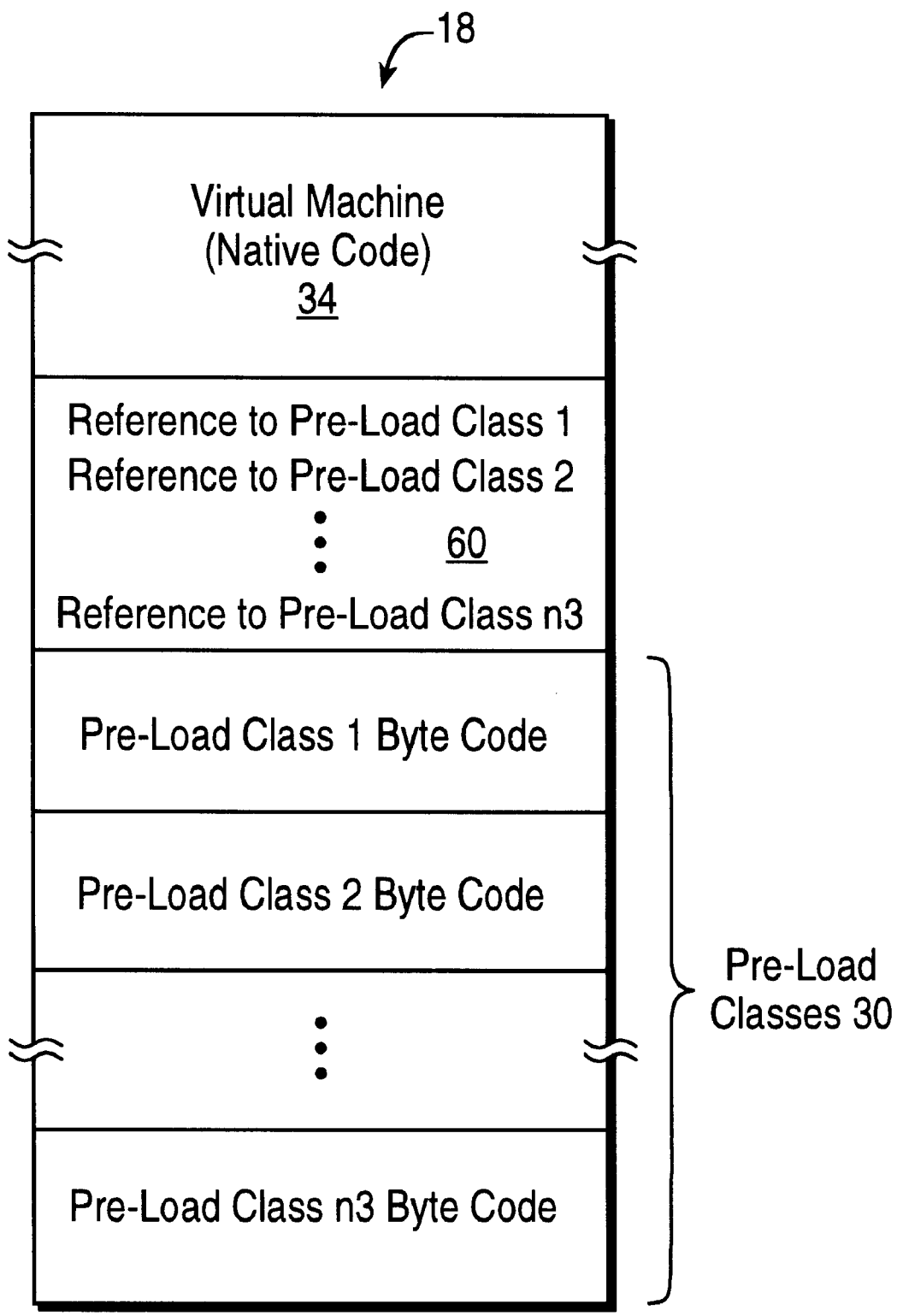
FIG. 4 shows an example arrangement for the custom software environment.

FIG. 4 shows an example arrangement for the custom software environment 18. The arrangement shown is built by the custom environment tools 16. The custom software environment tools 16 are used to assemble together the virtual machine 34, a set of code for each of the pre-load classes 1-n3 which were not excluded by user intervention, and a table 60 into the custom software environment 18. The virtual machine 34 is in one embodiment code native to the target device 14. The sets of code for the pre-load classes 1-n3 are in one embodiment Java byte code. In other embodiment, any one or more of the sets of code for the pre-load classes 1-n3 may be in Java byte code or native code for the target device 14.

The table 60 holds references, such as addresses, to the pre-load classes 1-n3 byte code. When the application program 32 invokes a method in one of the pre-load classes 1-n3, the virtual machine 34 obtains the appropriate reference from the table 60 and uses it to reference the appropriate byte code. For example, when the application program 32 invokes a method in the pre-load class 1, the virtual machine 34 obtains the reference to the pre-load class 1 from the table 60 and uses it to reference the pre-load class 1 byte code. The virtual machine 34 then interprets and executes the referenced byte code.

Figure 5:
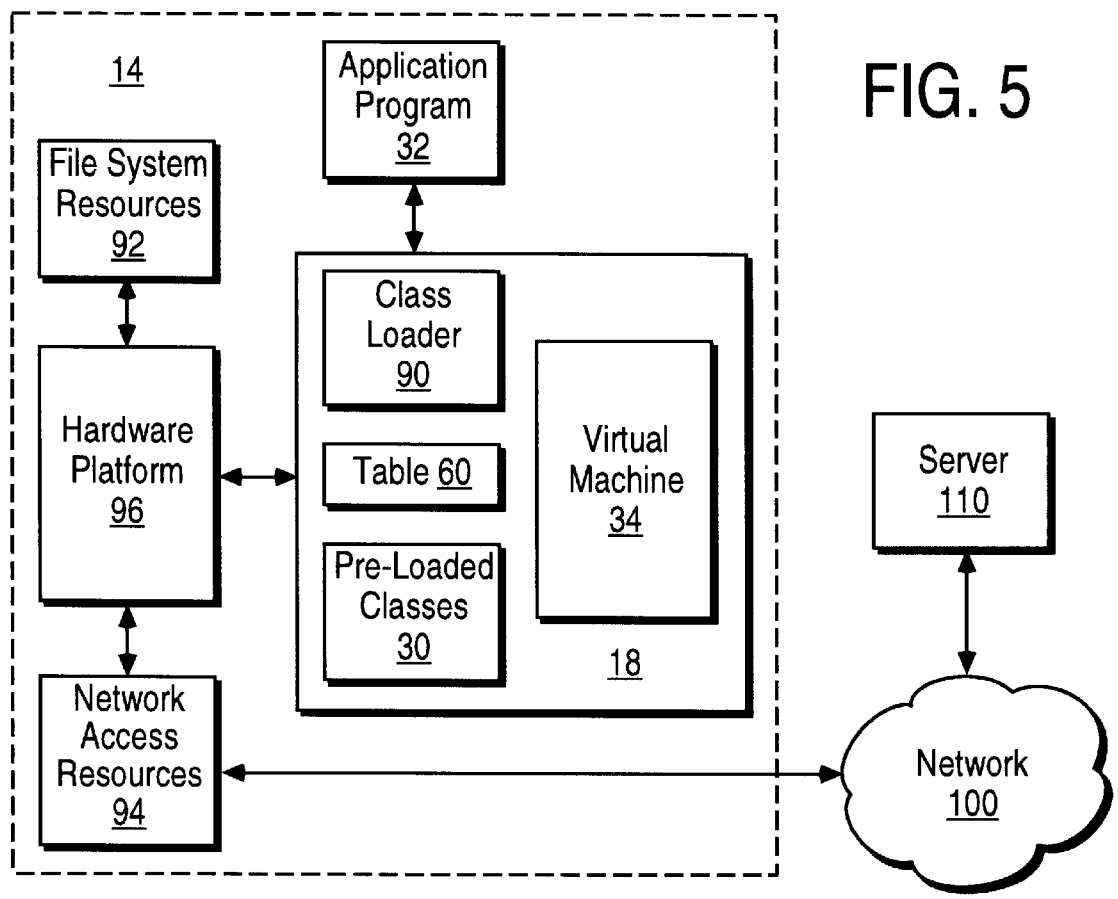
FIG. 5 shows one embodiment of a target device which is an embedded system.

FIG. 5 shows one embodiment of the target device 14. The target device 14 is an embedded system which includes a hardware platform 96 for the custom software environment 18 and the application program 32. The hardware platform 96 includes a processor and related resources such as memory. In this embodiment, the application program 32 is a Java application and the virtual machine 34 in the custom software environment 18 is a Java virtual machine with its native classes 1-n2 implemented in native code for the hardware platform 96.

In this embodiment, the target device 14 includes a set of file system resources 92. The file system resources 92 represent elements such as magnetic media including rotating media or solid-state devices or other storage mechanisms. The file system resources 92 also represents the appropriate software elements for implementing a file system in the target device 14. The file system resources 92 may be used to store one or more class libraries.

In this embodiment, the target device 14 also includes a set of network access resources 94. The network access resources 94 represent the appropriate hardware and software elements that enable communication via a network 100 using the hyper-text transfer protocol (HTTP). The physical communication path support by network access resources 94 may be a communication link such as Ethernet, a wireless communication link including infrared, a radio link including cellular radio, or a serial or parallel communication link depending on the nature and cost constraints associated with the design of the target device 14.

The virtual machine 34 of the custom software environment 18 includes a class loader 90 which executes appropriate ones of the pre-loaded classes 30 when the application program 32 invokes corresponding ones of the methods 1-n1. As described above, the pre-loaded classes 30 are preselected when the custom software environment 18 is created and built using the custom environment tools 16. The class loader 90 in this embodiment also loads classes from a class library in the persistent store 92 or from a server 110 via the network 100.

The server 110 may be an HTTP server which exports one or more Java class libraries. The class loader 90 as part of its configuration is provided with a uniform resource locator (URL) associated with the Java class libraries exported by the server 110. The class loader 90 loads a class from the server 110 by generating an HTTP GET command to the URL associated with the Java class libraries exported by the server 110 and transferring the HTTP GET command via the network 100. The server 110 in response transfers the specified files back to the target device 14 and the class loader 90 loads the files into memory for execution by the virtual machine 34.

Figure 6:
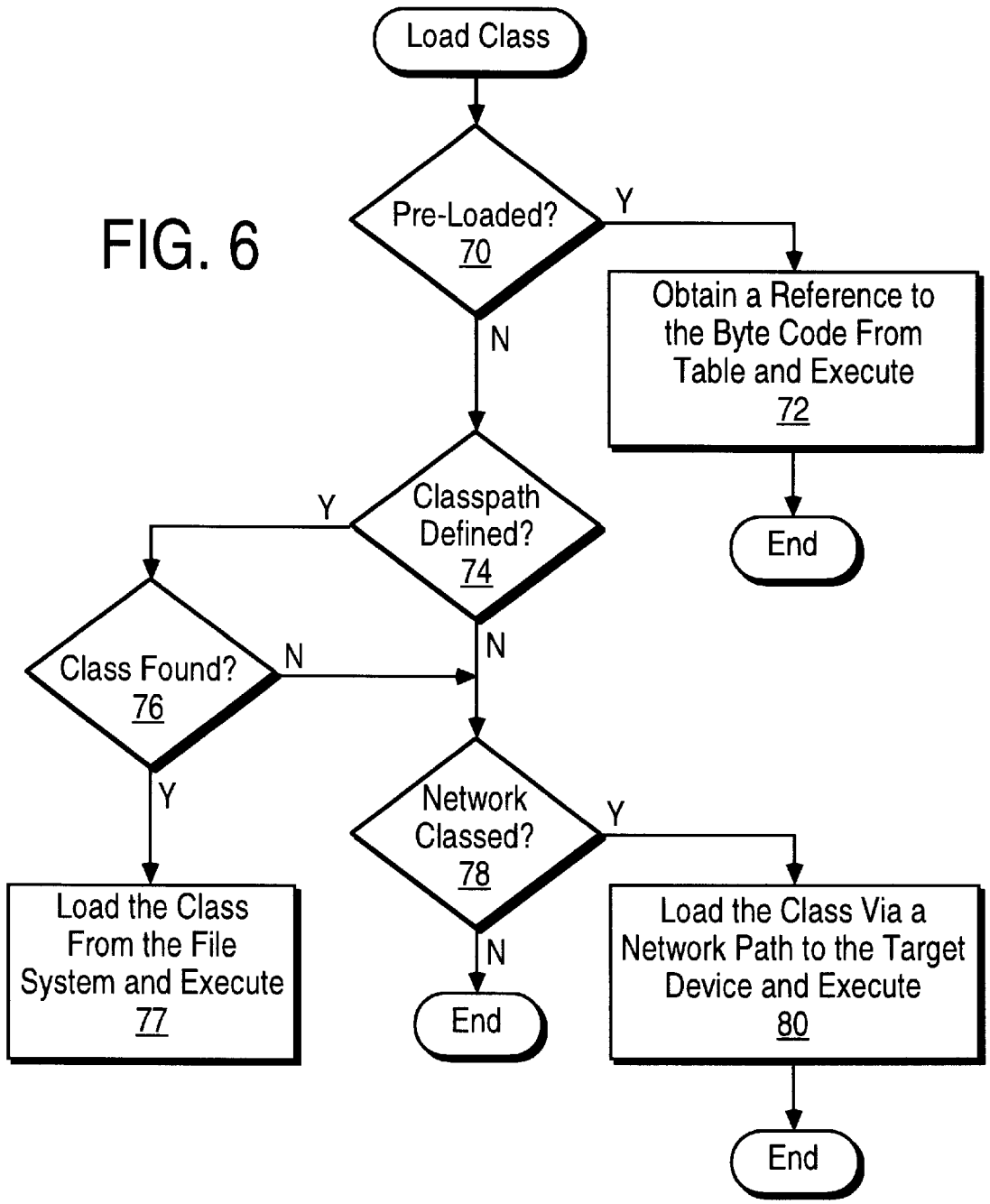
FIG. 6 shows steps implemented in a class loader of the custom software environment for loading a particular class during execution of the application program in the target device.

FIG. 6 shows steps implemented in the class loader 90 for loading a particular class which is not one of the native classes 1-n2. These steps are undertaken when the application program 32 invokes a method in the particular class. At step 70, the class loader 90 determines whether the particular class is one of the pre-loaded classes 30. This may be indicated in the table 60 or another table that identifies individual ones of the pre-loaded classes 30. If the particular class is one of the pre-loaded classes 30 then at step 72 the class loader 90 obtains a reference to the particular class from the table 60 and executes the referenced byte code in the pre-loaded classes 30.

If the particular class is not one of the pre-loaded classes 30 then at step 74 the class loader 90 determines whether a class path to a local file system is defined. This may be done using a CLASS PATH definition statement for the virtual machine 34 that specifies a file system pathname for class libraries provided in the target device 14. If a class path is not defined then the class loader 90 moves to step 78.

If a class path is defined then the class loader 90 moves to step 76. At step 76, if the particular class is found in the specified class libraries then the class loader 90 moves to step 77. At step 77, the particular class is loaded from the file system and executed. The particular class loaded from the file system may be in Java byte code or in native code for the hardware platform 96.

At step 78, the class loader 90 determines whether the particular class is network classed. In one embodiment, a class is network classed if a NETWORK CLASS PATH definition statement is provided to the virtual machine 34. The NETWORK CLASS PATH definition statement provides information that enables loading of the class via the network 100. An example NETWORK CLASS PATH definition statement is as follows.

NETWORK CLASS PATH="network class"
where network class is a URL of a class library which is being exported by the server 110.

If the particular class is network classed then at step 80, the class loader 90 loads the particular class via the network 100 to the target device 14 and executes it. For example, at step 80 the class loader 90 issues an HTTP GET command to the URL "network class" to obtain the byte code for the particular class. The code for the particular class obtained from the server 110 may be Java byte code or native code for the hardware platform 96.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A system for creating a custom software environment which when executed on a target device enables at least one application program to execute on the target device, the system comprising tools that (1) generate a pre-load class list that specifies a set of classes needed to support the application program and (2) build the custom software environment including a set of code for a virtual machine and a set of code for each of a set of pre-load classes specified in the pre-load class list wherein the tools perform the steps of:

determining a method to be invoked by the application program;

determining a class associated with the method;

if the class is not a native class of the virtual machine or is not listed in the pre-load class list then writing the class to the pre-load class list;

determining any dependant classes to the class;

for each dependent class, if the dependant class is not a native class of the virtual machine or is not listed in the pre-load class list then writing the dependent class to the pre-load class list.

2. The system of claim 1, wherein the class and the dependant class are not written to the pre-load class list if listed in a list of networked classes for the custom environment.

3. The system of claim 1, wherein the class and the dependant class are not written to the pre-load class list if listed in a list of classes for one or more other application programs for the target device.

4. The system of claim 1, wherein any one or more of the sets of code for the pre-load classes is Java byte code.

5. The system of claim 1, wherein any one or more of the sets of code for the pre-load classes is native code for the target device.

6. The system of claim 1, wherein the custom environment includes a table that stores a reference to each set of code for the pre-load classes.

7. The system of claim 6, wherein the virtual machine includes a class loader that performs the steps of:

determining whether a class invoked by the application program is one of the pre-load classes;

if the class invoked by the application program is one of the pre-load classes then obtaining the reference to the class invoked by the application program from the table.

8. The system of claim 7, wherein the class loader further performs the steps of:

determining whether the class invoked by the application program is located on a file system in the target device;

if the class invoked by the application program is located on the file system then loading the class invoked by the application program from the file system.

9. The system of claim 7, wherein the class loader further performs the steps of:

determining whether the class invoked by the application program is located on a network server;

if the class invoked by the application program is located on the network server then loading the class invoked by the application program from the network server.

10. The system of claim 9, wherein the step of loading the class invoked by the application program from the network server includes the step of transferring an HTTP GET command to the network server.

11. The system of claim 1, wherein a user excludes one or more of the classes from the pre-load class list from being built into the custom environment.

12. A device, comprising:

a set of processing resources;

application program;

custom software environment which is pre-built for executing the application program, the custom software environment including a set of code for a virtual machine and a set of code for each of a set of pre-load classes which are preselected for execution of the application program wherein the pre-load classes are pre-selected by pre-determining a method to be invoked by the application program and pre-determining a class associated with the method and if the class is not a native class of the virtual machine then pre-selecting the class and any dependant classes to the class wherein the custom software environment includes a table that stores a reference to each of the pre-loaded classes and wherein the custom software environment includes a class loader that performs the steps of:

determining whether a class invoked by the application program is one of the pre-loaded classes;

if the class invoked by the application program is one of the pre-loaded classes then obtaining the reference to the class invoked by the application program from the table.

13. The device of claim 12, further comprising a file system, wherein the class loader further performs the steps of:

determining whether the class invoked by the application program is stored on the file system;

if the class invoked by the application program is stored on the file system then loading the class invoked by the application program from the file system.

14. The device of claim 12, further comprising a set of network access resources wherein the class loader further performs the steps of:

determining whether the class invoked by the application program is located on a network server;

if the class invoked by the application program is located on the network server then loading the class invoked by the application program from the network server using the network access resources.

15. The device of claim 14, wherein the step of loading the class invoked by the application program from the network server includes the step of transferring an HTTP GET command to the network server.

* * * * *